US012609420B2

(12) United States Patent
Sakurai et al.

(10) Patent No.: US 12,609,420 B2
(45) Date of Patent: Apr. 21, 2026

(54) TERMINAL COMPONENT, SECONDARY BATTERY, AND METHOD FOR PRODUCING THE TERMINAL COMPONENT

(71) Applicant: PRIME PLANET ENERGY & SOLUTIONS, INC., Tokyo (JP)

(72) Inventors: Takahiro Sakurai, Nagoya (JP); Kota Ohata, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 630 days.

(21) Appl. No.: 17/662,872

(22) Filed: May 11, 2022

(65) Prior Publication Data

US 2022/0376368 A1 Nov. 24, 2022

(30) Foreign Application Priority Data

May 20, 2021 (JP) ................................. 2021-085553

(51) Int. Cl.
*H01M 50/562* (2021.01)
*C25D 3/12* (2006.01)

(52) U.S. Cl.
CPC ............ *H01M 50/562* (2021.01); *C25D 3/12* (2013.01)

(58) Field of Classification Search
CPC ............. H01M 50/562; H01M 50/557; H01M 50/564; H01M 50/566; H01M 50/543; H01M 50/553; C25D 3/12; C25D 5/48; C25D 5/50; C25D 7/00; C23C 18/32; H01R 4/62; H01R 43/18; B23K 11/002; B23K 11/20
See application file for complete search history.

(56) References Cited

U.S. PATENT DOCUMENTS

| | | | |
|---|---|---|---|
| 2011/0293995 A1* | 12/2011 | Sasaki | ................... H01M 50/55 |
| | | | 174/133 R |
| 2012/0148908 A1 | 6/2012 | Ito | |
| 2013/0071738 A1 | 3/2013 | Wang | |
| 2014/0011074 A1 | 1/2014 | Oda et al. | |
| 2016/0211489 A1* | 7/2016 | Yoshioka | ............ H01M 50/128 |
| 2017/0054131 A1* | 2/2017 | Yokota | ............... H01M 50/553 |
| 2018/0112322 A1 | 4/2018 | Takahashi | |

(Continued)

FOREIGN PATENT DOCUMENTS

| | | |
|---|---|---|
| CN | 106469801 A | 3/2017 |
| JP | 2012-138342 A | 7/2012 |

(Continued)

OTHER PUBLICATIONS

English translation of WO 2020/144904 A1 Dissimilar metal joined body; external terminal for secondary battery; Vehicle energy Japan INC; Jul. 16, 2020 (Year: 2020).*

(Continued)

*Primary Examiner* — Adam J Francis
(74) *Attorney, Agent, or Firm* — Finnegan, Henderson, Farabow, Garrett and Dunner, LLP

(57) ABSTRACT

A terminal component disclosed herein includes a first metal and a second metal stacked on the first metal. On the first metal, nickel is plated at least on a boundary surface with the second metal. A joining portion joined by diffusion of the metals is formed in a portion of a boundary between the first metal and the second metal.

10 Claims, 2 Drawing Sheets

(56)                   References Cited

U.S. PATENT DOCUMENTS

| | | | |
|---|---|---|---|
| 2018/0130995 A1 | 5/2018 | Nemoto et al. | |
| 2019/0119801 A1 | 4/2019 | Oda | |
| 2020/0381774 A1* | 12/2020 | Ueno | .................. H01M 50/172 |
| 2021/0151824 A1 | 5/2021 | Sadaki et al. | |
| 2021/0175567 A1* | 6/2021 | Kim | .................... H01M 50/552 |

FOREIGN PATENT DOCUMENTS

| | | | | | |
|---|---|---|---|---|---|
| JP | 2013-519213 | A | | 5/2013 | |
| JP | 2014-017081 | A | | 1/2014 | |
| JP | 2015-008146 | A | | 1/2015 | |
| JP | 2020099940 | A | * | 7/2020 | |
| KR | 10-2018-0052086 | A | | 6/2018 | |
| KR | 10-2018-0083430 | A | | 7/2018 | |
| WO | WO 2012/133654 | A1 | | 10/2012 | |
| WO | WO-2012169055 | A1 | * | 12/2012 | ............. H01M 2/06 |
| WO | WO 2018/173586 | A1 | | 9/2018 | |
| WO | WO 2018/221853 | A1 | | 12/2018 | |
| WO | WO-2020144904 | A1 | * | 7/2020 | |

OTHER PUBLICATIONS

English Translation of JP 2020099940 A—Metallic component Joining method; Nitto Seiko KK; Jul. 2, 2020 (Year: 2020).*

* cited by examiner

TERMINAL COMPONENT, SECONDARY BATTERY, AND METHOD FOR PRODUCING THE TERMINAL COMPONENT

The present disclosure relates to a terminal, a secondary battery, and a method for producing the terminal. The present application claims priority based on Japanese Patent Application No. 2021-085553 filed on May 20, 2021, and the entire contents of the patent application are incorporated herein by reference.

BACKGROUND

A technology of performing plating on a portion of a terminal member in order to increase weldability of a metal member forming a terminal for a secondary battery has been disclosed.

Japanese Laid-open Patent Publication No. 2014-017081 discloses a negative electrode terminal member including a negative electrode external terminal plate with a metal plated layer formed thereon and a negative electrode connection terminal. The negative electrode external terminal plate is disposed on a battery lid and is connected to a bus bar. The negative electrode external terminal plate includes a through hole. The negative electrode connection terminal passes through the through hole and is caulked via the metal plating layer. According to the above-described configuration, an adhesion between the negative electrode terminal plate and the negative electrode connection terminal can be increased, and a connection resistance can be reduced.

Japanese Translation of PCT International Application No. 2013-519213 discloses a soft package lithium battery tab material obtained by plating a nickel-plated layer on one side surface of a base and further plating a tin-plated layer on the nickel-plated layer. It is considered that the soft package lithium battery tab material has low production cost, high weldability, and suitable heat conductivity.

SUMMARY

Incidentally, the present inventor has examined use of a terminal component firmed of dissimilar metals as an external terminal for a secondary battery. In a case where a secondary battery is used for a vehicle, traveling vibrations of the vehicle is transmitted to an external terminal of the secondary battery via a bus bar. In a case where the external terminal is formed of a plurality of metals, the vibrations are transmitted to a joining interface between the metals. The present inventor wants to propose a terminal component in which, even when an external force, such as vibrations or the like, is transmitted, a joining interface between the metals is maintained and a durability of which is high.

A terminal component disclosed herein includes a first metal, and a second metal stacked on the first metal. On the first metal, nickel is plated at least on a boundary surface with the second metal. A joining portion joined by diffusion of the metals is formed in a portion of a boundary between the first metal and the second metal.

In the terminal component, the joining portion having a high joint strength is formed and an improved durability is achieved.

The joining portion may be formed to include a center position of the boundary surface.

In the first metal, an average thickness of nickel plating of the joining portion may be equal to or less than an average thickness of nickel plating of the boundary surface.

The second metal may include a recessed portion having an inner portion larger than an opening in a portion in which the second metal is stacked on the first metal. The first metal may have a portion that has entered the recessed portion.

In a secondary battery including a battery case and an electrode terminal mounted on the battery case, the electrode terminal may include a portion formed of the terminal component described above.

A method for producing a terminal component disclosed herein includes steps of preparing a first metal, preparing a second metal, and electrically connecting the first metal and the second metal and joining a portion of a boundary between the first metal and the second metal. On the first metal, nickel is plated on a boundary surface with the second metal.

In accordance with the above-described production method, a joining strength of a joining portion joined by diffusion of the metals can be increased.

In the first metal, a joining planned portion that is joined to the second metal may be set. An average thickness of nickel plating of the joining planned portion may be equal or less than an average thickness of nickel plating of the boundary surface.

The joining planned portion may be set to include a center position of the boundary surface.

The step of preparing the first metal may include plating nickel on the first metal by electroplating.

The step of preparing the first metal may include partially reducing a thickness of the nickel plating by polishing or laser irradiation.

DETAILED DESCRIPTION

Figure 1:
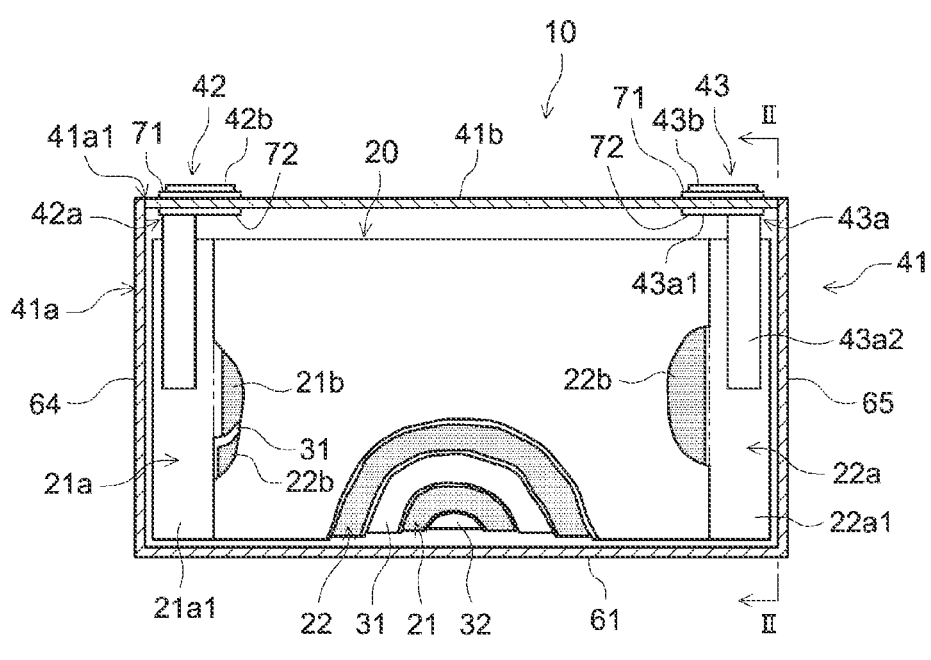
FIG. 1 is a partial cross-sectional view of a lithium-ion secondary battery 10.

One embodiment of a terminal component and a secondary battery disclosed herein will be described below. As a matter of course, the embodiment described herein is not intended to be particularly limiting the present disclosure. The present disclosure is not limited to the embodiments described herein, unless specifically stated otherwise. The accompanying drawings are schematic and do not necessarily reflect actual members or portions. Members/portions that have the same effect will be denoted by the same sign as appropriate and the overlapping description will be omitted. The notation "A to B" or the like that indicates a numerical range means "A or more and B or less" unless specifically stated otherwise. Dimension relations (length, width, thickness, or the like) in the drawings do not necessarily reflect actual dimensional relations.

As used herein, a term "secondary battery" refers to overall storage devices in which charge carriers move between a pair of electrodes (a positive electrode and a negative electrode) via an electrolyte and thus a charging and discharging reaction occurs. Such secondary batteries include not only so-called storage batteries, such as a lithium-ion secondary battery, a nickel hydrogen battery, a nickel cadmium battery, or the like, but also capacitors, such as an electric double-layered capacitor or the like. Among the above-described secondary batteries, an embodiment in which a lithium-ion secondary battery is a target will be described below.

<Lithium-Ion Secondary Battery 10>

Figure 2:
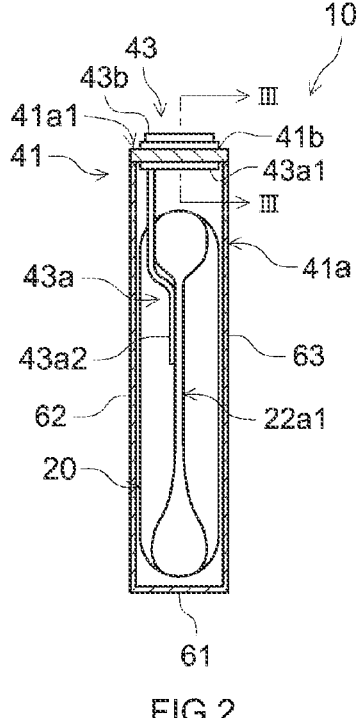
FIG. 2 is a cross-sectional view illustrating a cross section taken along the line II-II of FIG. 1.

FIG. 1 is a partial cross-sectional view of a lithium-ion secondary battery 10. In FIG. 1, a state where an inside of the lithium-ion secondary battery 10 is exposed along a broad width surface on one side of a battery case 41 having an approximately rectangular parallelepiped shape is illustrated. The lithium-ion secondary battery 10 illustrated in FIG. 1 is a so-called sealed battery. FIG. 2 is a cross-sectional view illustrating a cross section taken along the line II-II of FIG. 1. In FIG. 2, a partial cross-sectional view in a state where the inside of the lithium-ion secondary battery 10 is exposed along a narrow width surface on one side of the battery case 41 having an approximately rectangular parallelepiped shape is schematically illustrated.

As illustrated in FIG. 1, the lithium-ion secondary battery 10 includes an electrode body 20, the battery case 41, a positive electrode terminal 42, and a negative electrode terminal 43 (also referred to as electrode terminals 42 and 43).

<Electrode Body 20>

The electrode body 20 is housed in the battery case 41 in a state where the electrode body 20 is covered by an insulation film (not illustrated) or the like. The electrode body 20 includes a positive electrode sheet 21 as a positive element, a negative electrode sheet 22 as a negative electrode element, and separator sheets 31 and 32 as separators. Each of the positive electrode sheet 21, the first separator sheet 31, the negative electrode sheet 22, and the second separator sheet 32 is a long band-like member.

The positive electrode sheet 21 is configured such that a positive electrode active material layer 21b containing a positive electrode active material is formed on each of both surfaces on a positive electrode current collecting foil 21a (for example, an aluminum foil) having preset width and thickness excluding an unformed portion 21a1 set to have a uniform width in an end portion on one side in a width direction. For example, in a lithium-ion secondary battery, the positive electrode active material is a material, such as a lithium transition metal compound material, that releases lithium ions during charging and absorbs lithium ions during discharging. In general, various other materials than the lithium transition metal compound material have been proposed for positive electrode active materials, and there is no particular limitation on the positive electrode active material used herein.

The negative electrode sheet 22 is configured such that a negative electrode active material layer 22b containing a negative electrode active material is formed on each of both surfaces on a negative electrode current collecting foil 22a (a copper foil herein) having preset width and thickness excluding an unformed portion 22a1 set to have a uniform width in an end portion on one side in the width direction. For example, in a lithium-ion secondary battery, the negative electrode active material is a material, such as natural graphite, that absorbs lithium ions during charging and releases lithium ions absorbed during charging during discharging. In general, various other materials than the natural graphite have been proposed for negative electrode active materials, and there is no particular limitation on the negative electrode active material used herein.

For each of the separator sheets 31 and 32, for example, a porous resin sheet which has a required heat resistance and through which an electrolyte can pass is used. Various proposals have been made for the separator sheets 31 and 32, and there is no particular limitation on the separator sheets 31 and 32.

Herein, the negative electrode active material layer 22b is formed, for example, to have a width larger than that of the positive electrode active material layer 21b. Each of the separator sheets 31 and 32 has a width larger than that of the negative electrode active material layer 22b. The unformed portion 21a1 of the positive electrode current collecting foil 21a and the unformed portion 22a1 of the negative electrode current collecting foil 22a are disposed to face opposite directions away from each other. The positive electrode sheet 21, the first separator sheet 31, the negative electrode sheet 22, and the second separator sheet 32 are stacked in this order and are wound such that directions thereof are aligned to a long-side direction. The negative electrode active material layer 22b covers the positive electrode active material layer 21b with the separator sheets 31 and 32 interposed between the negative electrode active material layer 22b and the positive electrode active material layer 21b. The negative electrode active material layer 22b is covered by the separator sheets 31 and 32. The unformed portion 21a1 of the positive electrode current collecting foil 21a protrudes from one side of the separator sheets 31 and 32 in the width direction. The unformed portion 21a1 of the negative electrode current collecting foil 22a protrudes from the separator sheets 31 and 32 at an opposite side in the width direction.

As illustrate in FIG. 1, the above-described electrode body 20 is formed to be flat along a single plane including winding axis to be housed in a case body 41a of the battery case 41. The unformed portion 21a1 of the positive electrode current collecting foil 21a is disposed on one side along the winding axis of the electrode body 20 and the unformed portion 22a1 of the negative electrode current collecting foil 22a is arranged on an opposite side.

<Battery Case 41>

As illustrated in FIG. 1, the battery case 41 houses the electrode body 20 therein. The battery case 41 includes the case body 41a having an approximately rectangular parallelepiped shape with an opening on one side surface and a lid 41b attached to the opening. In this embodiment, from a view point of reducing a weight and ensuring a required rigidity, each of the case body 41a and the lid 41b is formed of aluminum or an aluminum alloy mainly containing aluminum.

<Case Body 41a>

The case body 41a has an approximately rectangular parallelepiped shape with an opening on one side surface. The case body 41a has an approximately rectangular bottom surface portion 61, a pair of broad width surface portions 62 and 63 (see FIG. 2), and a pair of narrow width surface portions 64 and 65. Each of the pair of broad width surface portions 62 and 63 rises from a corresponding longer side of the bottom surface portion 61. Each of the pair of narrow width surface portions 64 and 65 rises from a corresponding shorter side of the bottom surface portion 61. An opening 41a1 surrounded by the pair of broad width surface portions 62 and 63 and the pair of narrow width surface portions 64 and 65 is formed in one side surface of the case body 41a.

<Lid 41b>

The lid 41b is attached to the opening 41a1 of the case body 41a surrounded by longer sides of the pair of broad width surface portions 62 and 63 (see FIG. 2) and shorter sides of the pair of narrow width surface portions 64 and 65. A peripheral portion of the lid 41b is joined to an edge of the opening 41a1 of the case body 41a. The above-described joining may be achieved, for example, by continuous welding without any gap. Such welding can be realized, for example, by laser welding.

In this embodiment, the positive electrode terminal 42 and the negative electrode terminal 43 are mounted on the lid 41*b*. The positive electrode terminal 42 includes an internal terminal 42*a* and an external terminal 42*b*. The negative electrode terminal 43 includes an internal terminal 43*a* and an external terminal 43*b*. Each of the internal terminals 42*a* and 43*a* is mounted on an inside of the lid 41*b* via an insulator 72. Each of the external terminals 42*b* and 43*b* is mounted on an outside of the lid 41*b* via a gasket 71. Each of the internal terminals 42*a* and 43*a* extends inside the battery case 41. The internal terminal 42*a* of the positive electrode is connected to the unformed portion 21*a*1 of the positive electrode current collecting foil 21*a*. The internal terminal 43*a* of the negative electrode is connected to the unformed portion 22*a*1 of the negative electrode current collecting foil 22*a*.

The unformed portion 21*a*1 of the positive electrode current collecting foil 21*a* and the unformed portion 22*a*1 of the negative electrode current collecting foil 22*a* in the electrode body 20 are mounted on the internal terminals 42*a* and 43*a* each being mounted on a corresponding one of both side portions of the lid 41*b* in a longitudinal direction, respectively, as illustrated in FIG. 1. The electrode body 20 is housed in the battery case 41 so as to be mounted on the internal terminals 42*a* and 43*a* each being mounted on the lid 41*b*. Note that, herein, a wound type electrode body 20 is illustrated as an example. A structure of the electrode body 20 is not limited to the above-described structure. The structure of the electrode body 20 may be, for example, a stacked structure in which a positive electrode sheet and a negative electrode sheet are alternately stacked via a separator sheet therebetween. A plurality of electrode bodies 20 may be housed in the battery case 41.

The battery case 41 may be configured to house an unillustrated electrolytic solution with the electrode body 20. As the electrolytic solution, a nonaqueous electrolytic solution obtained by dissolving a supporting salt into a non-aqueous solvent may be used. Examples of the non-aqueous solvent include a carbonate base solvent, such as ethylene carbonate, dimethyl carbonate, ethyl methyl carbonate, or the like. Examples of the supporting salt include a fluorine-containing lithium salt, such as $LiPF_6$ or the like.

Figure 3:
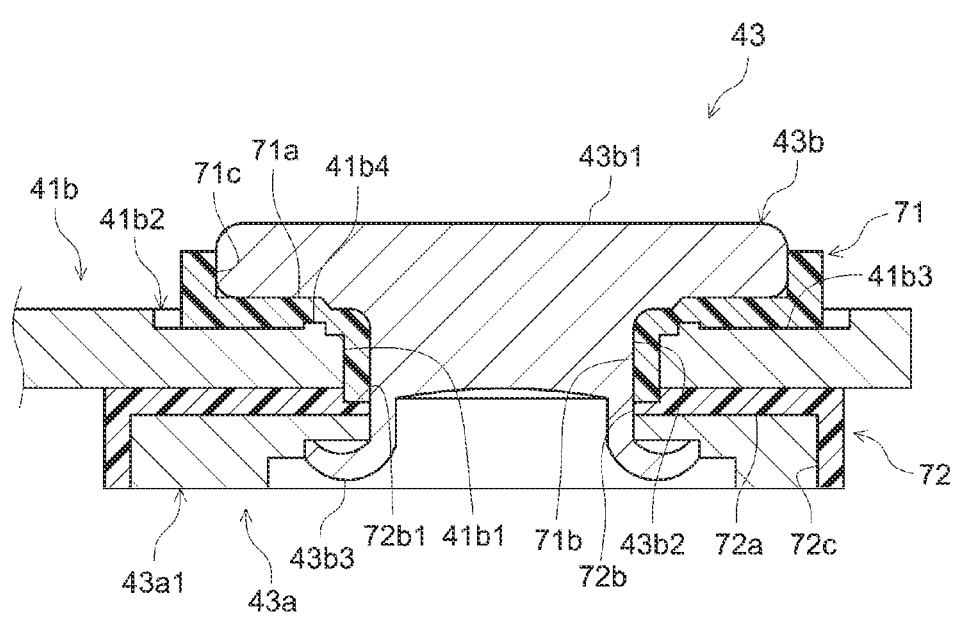
FIG. 3 is a cross-sectional view illustrating a cross section taken along the line III-III of FIG. 2.

FIG. 3 is a cross-sectional view taken along the line III-III of FIG. 2. In FIG. 3, a cross section of a portion in which the negative electrode terminal 43 is mounted on the lid 41*b* is illustrated. In this embodiment, a member obtained by joining dissimilar meals is used for the external terminal 43*b* of the negative electrode. In FIG. 3, a structure of the dissimilar metals forming the external terminal 43*b*, an interface of the dissimilar metals, and the like are not illustrated and a cross-sectional shape of the external terminal 43*b* is schematically illustrated.

As illustrated in FIG. 3, the lid 41*b* includes a mounting hole 41*b*1 used for mounting the external terminal 43*b* of the negative electrode. The mounting hole 41*b*1 passes through the lid 41*b* in a preset position of the lid 41*b*. The internal terminal 43*a* and the external terminal 43*b* of the negative electrode are mounted in the mounting hole 41*b*1 of the lid 41*b* with the gasket 71 and the insulator 72 interposed therebetween. At an outside of the mounting hole 41*b*1, a step 41*b*2 to which the gasket 71 is attached is provided around the mounting hole 41*b*1. A seating surface 41*b*3 on which the gasket 71 is disposed is provided on the step 41*b*2.

A protrusion 41*b*4 used for positioning the gasket 71 is provided on the seating surface 41*b*3.

As illustrated in FIG. 3, the external terminal 43*b* of the negative electrode includes a head portion 43*b*1, a shaft portion 43*b*2, and a caulking piece 43*b*3. The head portion 43*b*1 is a portion disposed on the outside of the lid 41*b*. The head portion 43*b*1 is an approximately flat plate-like portion larger than the mounting hole 41*b*1. The shaft portion 43*b*2 is a portion mounted in the mounting hole 41*b*1 via the gasket 71. The shaft portion 43*b*2 protrudes downward from an approximately center portion of the head portion 43*b*1. As illustrated in FIG. 3, the caulking piece 43*b*3 is a portion caulked to the internal terminal 43*a* of the negative electrode inside the lid 41*b*. The caulking piece 43*b*3 extends from the shaft portion 43*b*2, is bent after being inserted in the lid 41*b*, and is caulked to the internal terminal 43*a* of the negative electrode.

<Gasket 71>

As illustrated in FIG. 3, the gasket 71 is a portion mounted on the mounting hole 41*b*1 and the seating surface 41*b*3 of the lid 41*b*. In this embodiment, the gasket 71 includes a seating portion 71*a*, a boss portion 71*b*, and a side wall 71*c*. The seating portion 71*a* is a portion attached to the seating surface 41*b*3 provided on an outer surface of the lid 41*b* around the mounting hole 41*b*1. The seating portion 71*a* includes an approximately flat surface in accordance with the seating surface 41*b*3. The seating portion 71*a* includes a recess corresponding to the protrusion 41*b*4 of the seating surface 41*b*3. The boss portion 71*b* protrudes from a bottom surface of the seating portion 71*a*. The boss portion 71*b* has an outer shape along an inner surface of the mounting hole 41*b*1 to be mounted in the mounting hole 41*b*1. An inner surface of the boss portion 71*b* is an attaching hole to which the shaft portion 43*b*2 of the external terminal 43*b* is attached. The side wall 71*c* rises upward from a peripheral edge of the seating portion 71*a* and extends upward. The head portion 43*b*1 of the external terminal 43*b* is attached to a portion of the gasket 71 surrounded by the side wall 71*c*.

The gasket 71 is disposed between the lid 41*b* and the external terminal 43*b* to ensure insulation between the lid 41*b* and the external terminal 43*b*. The gasket 71 ensures airtightness of the mounting hole 41*b*1 of the lid 41*b*. In view of the foregoing, a material excellent in chemical resistance and weather resistance may be used. In this embodiment, PEA is used for the gasket 71. PFA is a tetrafluoroethylene-perfluoroalkylvinylether copolymer. Note that a material used for the gasket 71 is not limited to PFA.

<Insulator 72>

The insulator 72 is a portion attached to the inside of the lid 41*b* around the mounting hole 41*b*1 of the lid 41*b*. The insulator 72 includes a base portion 72*a*, a hole 72*b*, and a side wall 72*c*. The base portion 72*a* is a portion disposed along the inner surface of the lid 41*b*. In this embodiment, the base portion 72*a* is an approximately flat plate-like portion. The base portion 72*a* is disposed along the inner surface of the lid 41*b* and has a size with which the base portion 72*a* does not protrude from the lid 41*b* to be accommodated in the case body 41*a*. The hole 72*b* is a hole provided to correspond to the inner surface of the boss portion 71*b* of the gasket 71. In this embodiment, the hole 72*b* is provided in an approximately center portion of the base portion 72*a*. A step 72*b*1 that is recessed is provided around the hole 72*b* on a side surface opposed to the inner surface of the lid 41*b*. A tip end of the boss portion 71*b* of the gasket 71 attached to the mounting hole 41*b*1 is accommodated in the step 72*b*1 without interference. The side wall 72c rises from a peripheral edge portion of the base portion 72a and extends downward. A base portion 43a1 provided at one end of the internal terminal 43a of the negative electrode is accommodated in the base portion 72a. The insulator 72 is provided inside the battery case 41, and therefore, may have a required chemical resistance. In this embodiment, PPS is used for the insulator 72. PPS is poly phenylene sulfide resin. Note that a material used for the insulator 72 is not limited to PPS.

The internal terminal 43a of the negative electrode includes the base portion 43a1 and a connection piece 43a2 (see FIG. 1 and FIG. 2). The base portion 43a1 is a portion attached to the base portion 72a of the insulator 72. In this embodiment, the base portion 43a1 has a shape corresponding to an inside of the side wall 72c around the base portion 72a of the insulator 72. The connection piece 43a2 extends from one end of the base portion 43a1, further extends in the case body 41a, and is connected to the unformed portion 22a1 of the negative electrode of the electrode body 20 (see FIG. 1 and FIG. 2).

In this embodiment, the boss portion 71b is attached to the mounting hole 41b1 and the gasket 71 is mounted on the outside of the lid 41b. The external terminal 43b is attached to the gasket 71. At this time, the shaft portion 43b2 of the external terminal 43b is inserted through the boss portion 71b of the gasket 71 and the head portion 43b1 of the external terminal 43b is disposed on the seating portion 71a of the gasket 71. The insulator 72 and the negative electrode terminal 43 are mounted on the inside of the lid 41b. As illustrated in FIG. 3, the caulking piece 43b3 of the external terminal 43b is bent to be caulked to the base portion 43a1 of the negative electrode terminal 43. The caulking piece 43b3 of the external terminal 43b and the base portion 43a1 of the negative electrode terminal 43 may be partially joined together by welding or metal joining in order to improve conductivity.

Incidentally, in the internal terminal 42a of the positive electrode of the lithium-ion secondary battery 10, a required level of oxidation reduction resistance is not as high as that in the positive electrode. In view of the required oxidation reduction resistance and reduction in weight, aluminum can be used for the internal terminal 42a of the positive electrode (see FIG. 1). In contrast, in the internal terminal 43a of the negative electrode, a required level of oxidation reduction resistance is higher than that in the positive electrode. In view of the foregoing, copper is used for the internal terminal 43a of the negative electrode. On the other hand, in the bus bar to which the external terminal 43b is connected, in view of reduction in weight and cost cut, aluminum or an aluminum alloy can be used.

The present inventor has examined use of different types of metals in a portion connected to the internal terminal 43a and a portion connected to the bus bar. That is, the present inventor has examined use of a metal having high weldability for the portion connected to the bus bar and the portion connected to the internal terminal 43a in the external terminal 43b. However, in findings of the present inventor, there are problems regarding conductivity and joining strength in dissimilar metal joining. The present inventor has examined mechanically fastening metals and metallurgically joining in order to ensure conduction between metals.

A terminal component 200 disclosed herein will be described below as well as a method for producing the terminal component 200. The terminal component 200 is formed of copper and aluminum herein. Note that metals forming the external terminal 43b are not limited to copper and aluminum.

<Terminal Component 200>

Figure 4:
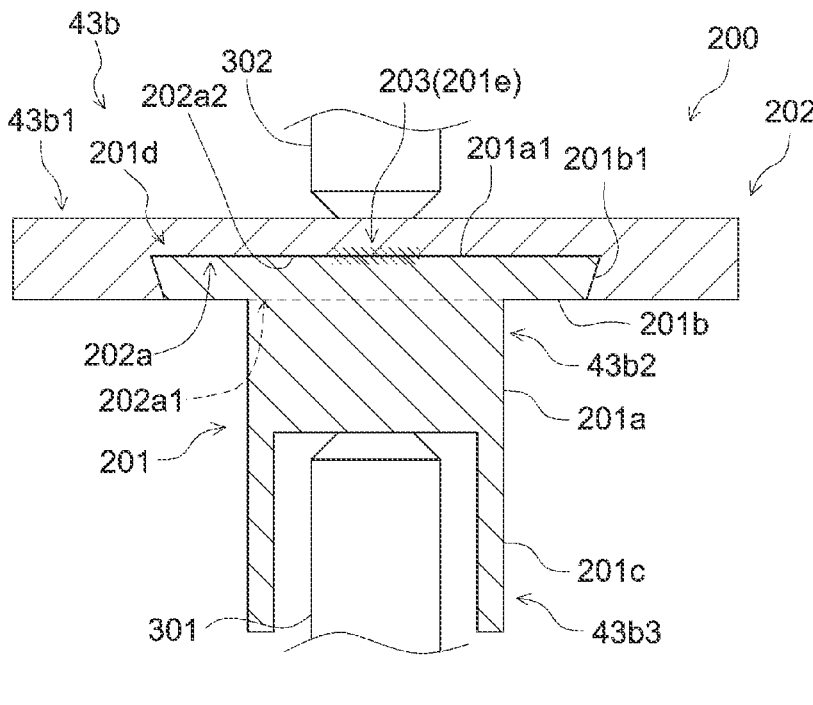
FIG. 4 is a cross-sectional view schematically illustrating a terminal component 200.

FIG. 4 is a cross-sectional view schematically illustrating the terminal component 200. The terminal component 200 can be used as the external terminal 43b of the negative electrode illustrated in FIG. 3. In FIG. 4, for the terminal component 200, a structure of dissimilar metals and an interface of the dissimilar metals are schematically illustrated. In FIG. 4, steps of joining a first metal 201 and a second metal 202 forming the terminal component 200 together is schematically illustrated.

The terminal component 200 includes the first metal 201 and the second metal 202 stacked on the first metal 201. On the first metal 201, nickel is plated on at least a boundary surface with the second metal 202. A joining portion 203 joined by diffusion of the metals is formed in a portion of a boundary between the first metal 201 and the second metal 202. In this embodiment, as illustrated in FIG. 4, the second metal 202 includes a recessed portion 202a in a portion stacked on the first metal 201. The recessed portion 202a has an inner portion larger than the opening 202a1. The first metal 201 includes a portion that has entered the recessed portion 202a. In this embodiment, nickel is plated on a surface of the portion that has entered the recessed portion 202a (that is, an end portion 201a1 in which a flange portion 201b is provided and an outer edge 201b1 of the flange portion 201b). The joining portion 203 is formed in a portion of a boundary between the first metal 201 and a bottom portion 202a2 of the recessed portion 202a of the second metal 202.

A method for producing the terminal component 200 includes the following steps of:
(a) preparing the first metal 201;
(b) preparing the second metal 202; and
(c) electrically connecting the first metal 201 and the second metal 202 and joining a portion of a boundary between the first metal 201 and the second metal 202. On the first metal, nickel is plated on boundary surfaces 201a1 and 201b1 with the second metal 202.

<Step (a): Preparing First Metal 201>

In the step (a), the first metal 201 is prepared. This step may include plating nickel on the first metal 201.

The first metal 201 is disposed to face the inside of the battery case 41 of the terminal component 200 and forms a portion connected to the internal terminal 43a of the negative electrode. In this embodiment, the first metal 201 is formed of copper on which nickel is plated. The first metal 201 can be prepared by performing known metal processing on a material (copper in this embodiment) of the first metal 201 and then plating nickel on the processed first metal 201. The metal processing can be performed, for example, by forge processing, cutting, or the like. Nickel plating can be performed, for example, by nonelectrolytic plating, electrolytic plating, or the like.

In this embodiment, the first metal 201 includes a shaft portion 201a and the flange portion 201b extending from one end of the shaft portion 201a in an outer diameter direction. The end portion 201a1 of the first metal 201 in which the flange portion 201b is provided has an appropriately circular shape. The flange portion 201b is continuously formed in a circumferential direction of the shaft portion 201a. The outer edge 201b1 of the flange portion 201b is formed of a tapered surface that is inclined such that an outer diameter gradually reduces from an end surface side of the first metal 201 including the flange portion 201b toward the other side surface side. In the shaft portion 201a, a portion 201c serving as the caulking piece 43b3 further caulked to the internal terminal 43$a$ is provided on an opposite side to a side on which the flange portion 201$b$ is provided.

On the first metal 201 prepared in this step, nickel is plated at least on a surface of a portion 201$d$ entering the recessed portion 202$a$ of the second metal 202. There is no particular limitation on a thickness of nickel plating of the end portion 202$a$1, but the thickness may be 1 μm or more and may be, for example, 3μ or more. The thickness of the nickel plating of the end portion 201$a$1 may be 20 μm or less and may be, for example, 10 μm or less. The thickness of the nickel plating can be measured, for example, by an SEM image or an optical microscope of high magnification (for example, magnification of 500 or more).

In this embodiment, a joining planned portion 201$e$ joined to the second metal 202 is set in the first metal 201. The joining planned portion 201$e$ is set to includes a center position of a surface opposed to the bottom portion 202$a$2 of the second metal 202 (that is, the boundary surface 201$a$1). In the joining planned portion 201$e$, as compared to other portions of the portion 201$d$ that has entered the recessed portion 202$a$, the thickness of the nickel plating is thinner.

The thickness of the nickel plating of the joining planned portion 201$e$ may be equal to or less than an average thickness of the nickel plating of the boundary surfaces 201$a$1 and 201$b$1. Although the thickness of the nickel plating is not particularly limited, the thickness of the nickel plating of the joining planned portion 201$e$ may be equal to or less than 0.5 times of the average thickness of the nickel plating of the boundary surfaces 201$a$1 and 201$b$1. Moreover, the thickness of the nickel plating of the joining planned portion 201$e$ may be equal to or more than 0.1 times of the average thickness of the nickel plating of the boundary surfaces 201$a$1 and 201$b$1, and may be equal to or more than 0.2 times thereof.

As described above, nickel plating on the first metal 201 can be performed, for example, by nonelectrolytic plating, electrolytic plating, or the like. Processing conditions for plating are set in accordance with the thickness of nickel plating performed on the first metal 201 or the like, as appropriate. In view of making the thickness of plating of the first metal 201 uniform, nonelectrolytic plating may be performed, but it is preferable to perform plating on the first metal 201 by electrolytic plating. In performing plating by nonelectrolytic plating, it is necessary to reduce the thickness of plating of the joining planned portion 201$e$ or to perform processing of removing plating. The processing conditions are not limited to those described above, and the thickness of plating may be adjusted, for example, by a method in which plating is performed with the joining planned portion 201$e$ masked, a method in which processing of reducing the thickness of plating of the joining planned portion 201$e$ after plating, or like method. As the processing of reducing the thickness, for example, the thickness of nickel plating is partially reduced by polishing, laser irradiation, or the like. When the thickness of plating is adjusted by any one of the above-described methods, a polishing mark can be left in a portion in which the thickness has been reduced. In electrolytic plating, the thickness of plating tends to be increased in a portion, such as an edge, a corner, or the like, of the first metal 201 in which a high electric resistance is exhibited. Therefore, as compared to the end portion 201$a$1 of the first metal 201, the thickness of plating in the flange portion 201$b$ and a portion near the flange portion 201$b$ is larger. That is, the joining planned portion 201$e$ can be set around the center position of the end portion 201$a$1 without performing thickness adjustment. Note that, after electrolytic plating, the thickness of plating may be partially adjusted to adjust a range of the joining planned portion 201$e$.

Nickel has a high laser absorptivity for a laser beam having a wavelength of around 1 μm, as compared to copper and aluminum. In this embodiment, in the first metal 201, nickel plating is performed not on only the portion 201$d$ entering the recessed portion 202$a$ of the second metal 202 but an entire surface of the first metal 201. Therefore, a weldability of the portion 201$c$ serving as the caulking piece 43$b$3 of the external terminal 43$b$ and the internal terminal 43$a$ can be achieved. In addition, nickel has a high electric resistance, as compared to copper and aluminum. The electric resistance in a portion in which the thickness of nickel plating is small (the joining planned portion 201$e$) is suppressed to a low level. A degree of purity of nickel used for nickel plating is preferably high in view of improving the weldability and concentrating current in the joining planned portion 201$e$ in a step (c) described later.

Step (b): Preparing Second Metal 202>

In the step (b), the second metal 202 is prepared. In this embodiment, the second metal 202 includes the recessed portion 202$a$ having an inner portion larger than the opening 202$a$1. The second metal 202 forms a portion of the terminal component 200 exposed to the outside of the battery case 41 and connected to an external connection portion, such as a bus bar or the like.

In this embodiment, the second metal 202 is formed of aluminum having an extensibility and a lower rigidity than that of the first metal 201. The second metal 202 includes the recessed portion 202$a$ that can cover the end portion 201$a$1 of the first metal 201 including the flange portion 201$b$, in this embodiment, a side surface of the recessed portion 202$a$ is a tapered surface inclined to gradually expand from the opening 202$a$1 toward the bottom portion 202$a$2. The second metal 202 can be prepared by performing known metal processing on a material of the second metal 202 (aluminum in this embodiment).

The bottom portion 202$a$2 of the recessed portion 202$a$ of the second metal 202 has a size corresponding to the outer diameter of the flange portion 201$b$ of the first metal 201. As described above, the recessed portion 202$a$ is inclined from the opening 202$a$1 toward the bottom portion 202$a$2. Therefore, the opening 202$a$1 of the recessed portion 202$a$ has an opening area smaller than the outer diameter of the flange portion 201$b$ of the first metal 201.

<Step (c): Electrically Connecting First Metal 201 and Second Metal 202 and Joining Them>

In the step (c), the first metal 201 and the second metal 202 are electrically connected to each other and a portion of a boundary between the first metal 201 and the second metal 202 is joined by diffusion of the metals.

In this embodiment, a portion of the first metal 201 is caused to enter the recessed portion 202$a$ of the second metal 202 and thus the first metal 201 and the second metal 202 are mechanically joined together. Thereafter, the first metal 201 and the second metal 202 are joined together by diffusion of the metals.

First, the first metal 201 is caused to enter the recessed portion 202$a$ by mutually pressurizing the first metal 201 and the second metal 202. For example, a required pressure is applied using a pressing machine or the like in a state where the second metal 202 is stacked on the end portion 201$a$1 of the first metal 201. Thus, the second metal 202 is plastically deformed and a portion including the flange portion 201$b$ of the first metal 201 enters the recessed portion 202$a$. As illustrated in FIG. 4, the end portion 201$a$1 including the flange portion 201b of the first metal 201 is housed in the recessed portion 202a of the second metal 202. A so-called caulking structure is formed in the first metal 201 and the second metal 202. The first metal 201 and the second metal 202 are mechanically fastened in the above-described manner, and thus, a high joining strength of the first metal 201 and the second metal 202 is realized.

Next, in this embodiment, the first metal 201 and the second metal 202 are joined together by so-called resistance welding. The first metal 201 and the second metal 202 mechanically fastened in the step (c) are sandwiched between electrodes 301 and 302 and are electrically connected to each other. There is no particular limitation on conditions for electrically connecting the first metal 201 and the second metal 202. For example, an electrical value can be set to about 9 kA to 12 kA, a pressure can be set to about 50 N to 500 N, and a time for electrically connecting the first and second metals 201 and 202 can be set to 20 ms to 300 ms.

The joining planned portion 201e of the first metal 201 has a smaller thickness of nickel plating, as compared to other portions. In this embodiment, the thickness of nickel plating of the joining planned portion 201e is equal to or less than an average thickness of nickel plating of the boundary surfaces 201a1 and 201b1. When the first metal 201 and the second metal 202 are electrically connected to each other, current is concentrated in the joining planned portion 201e in which an electric resistance is suppressed to a low level. When the current is concentrated in the joining planned portion 201e, a calorific value in the portion in which the current is concentrated is increased. In the joining planned portion 201e in which the calorific value has increased, diffusion of nickel occurs. In this embodiment, nickel is diffused in an aluminum side (a second metal 202 side) in which diffusion tends to occur. Thus, the first metal 201 and the second metal 202 are joined together and the joining portion 203 is formed.

In the above-described manner, the terminal component 200 can be produced.

The joining portion 203 of the terminal component 200 is joined by so-called solid phase joining. Thus, a conduction resistance between the first metal 201 and the second metal 202 is suppressed to a low level.

A joining structure in which nickel plating performed on the first metal 201 is diffused to about a thickness of 1 μm to 20 μm in the aluminum side forming the second metal 202 can be realized in the joining portion 203, although the structure differs depending on conditions for electrically connecting the first metal 201 and the second metal 202 and plating, or the like. That is, nickel plated on the first metal 201 formed of copper is diffused in the second metal 202 side formed of the aluminum, so that the first metal 201 and the second metal 202 are joined together. Moreover, nickel exists at the boundary, and therefore, diffusion of copper in aluminum can be suppressed. Thus, formation of an intermetallic compound having a small strength by aluminum of the first metal 201 and the second metal 202 is suppressed. For the above-described joining state, it can be confirmed that nickel is disused to aluminum in an atomic level, for example, by analyzing a cross-section of the joining portion by an electron probe microanalyzer (EPMA).

In the above-described terminal component 200, the joining portion 203 joined by diffusion of the metals is formed at the boundary between the first metal 201 and the second metal 202. The joining portion 203 is joined by diffusion of the metals, so that a low conduction resistance is realized even when dissimilar metals are used. Furthermore, as described above, formation of the intermetal compound is suppressed, and joining high strength is realized. Therefore, the durability of the joining portion 203 is improved.

In the above-described embodiment, the joining portion 203 of the terminal component 200 is formed to include the center position of the boundary surface 201a1. By using the terminal component 200 having the above-described structure as the external terminal 43b of the lithium-ion secondary battery 10, a structure in which an electrolytic solution is less likely to enter an interface between the first metal 201 and the second metal 202 and the joining portion 203 is less likely to be corroded can be achieved. Also, when a bus bar is attached to the terminal component 200 used as the external terminal 43b and a vibration is transmitted through the bus bar, a large force is less likely to be applied to the joining portion 203 by forming the joining portion 203 to include the center portion of the recessed portion 202a.

In the lithium-ion secondary battery 10 including the battery case 41 and the electrode terminals 42 and 43 mounted on the battery case 41, as illustrated in FIG. 1, each of the electrode terminals 42 and 43 may include a portion formed by the above-described terminal component 200 (see FIG. 4).

A terminal component and a secondary battery disclosed herein have been described above in various forms. However, the embodiment of the terminal component and the battery disclosed herein shall not limit the present disclosure, unless specifically stated otherwise. Various changes can be made to the battery disclosed herein and each of components and processes described herein can be omitted as appropriate or can be combined with another one or other ones of the components and the processes as appropriate, unless a particular problem occurs.

For example, in the above-described embodiment, the second metal 202 having an inner portion larger than the opening 202a1 is stacked on the first metal 201 including the shaft portion 201a and the flange portion 201b extending from one end of the shaft portion 201a in the outer diameter direction. However, the first metal is not limit to a form including a flange portion. For example, the first metal may include a portion protruding from a shaft portion and be configured such that the protruding potion enters a recessed portion of the second metal. Moreover, the portion of the first metal entering the recessed portion may not be continuously formed but may be intermittently formed.

In the above-described embodiment, the recessed portion 202a of the second metal 202 is a tapered surface inclined from the opening 202a1 toward the bottom portion 202a2. The flange portion 201b of the first metal 201 has a shape corresponding to the recessed portion 202a. The present disclosure is not limit to the above-described embodiment. For example, the recessed portion may have a shape in which a center portion of a side surface thereof is wide.

Moreover, in the above-described embodiment, the joining portion 203 is formed in one position to include the center potion of the recessed portion 202a of the second metal 202. However, there is no particular limitation on the number of joining portions and positions thereof. A plurality of joining portions may be provided in a plurality of positions. The joining portion may be also provided on a side surface of the recessed portion of the second metal. The number of joining portions and positions thereof may be set as appropriate in accordance with the first metal and the second metal.

What is claimed is:

1. A terminal component comprising:
a first metal formed of copper; and a second metal formed of aluminum or aluminum alloy, the second metal being stacked on the first metal, wherein, on the first metal, nickel is plated at least on an entire surface of a boundary surface of the first metal at an interface with the second metal, wherein the average thickness of the nickel plating in a central region of the boundary surface at the interface between the first metal and the second metal is less than the average thickness of the nickel plating on the boundary surface, and a joining portion jointed by diffusion of the metals is formed in the central region of the boundary surface between the first metal and the second metal, wherein in other regions of the boundary surface, there is less diffusion of copper into the second metal as compared to the amount of diffusion of copper into the second metal in the central region.

2. The terminal component according to claim 1, wherein the joining portion is formed to include a center position of the boundary surface.

3. The terminal component according to claim 1, wherein, in the first metal, an average thickness of nickel plating of the joining portion is less than an average thickness of nickel plating of the boundary surface.

4. The terminal component according to claim 1, wherein the second metal includes a recessed portion having an inner portion larger than an opening in a portion in which the second metal is stacked on the first metal, and the first metal has a portion that has entered the recessed portion.

5. A secondary battery comprising:

a battery case; and an electrode terminal mounted on the battery case, wherein the electrode terminal includes a portion formed of the terminal component according to claim 1.

6. A method for producing a terminal component, the method comprising steps of:

preparing a first metal formed of copper;

preparing a second metal formed of aluminum or aluminum alloy; and electrically connecting the first metal and the second metal and joining a portion of a boundary surface of the first metal at an interface between the first metal and the second metal, wherein the joining is performed by diffusion of the metals in a central region of the boundary surface, wherein, on the first metal, nickel is plated on an entire surface of the boundary surface of the first metal at the interface with the second metal, wherein the average thickness of the nickel plating in the central region of the boundary surface at the interface between the first metal and the second metal is less than the average thickness of the nickel plating on the boundary surface, and wherein in other regions of the boundary surface, there is less diffusion of copper into the second metal as compared to the amount of diffusion of copper into the second metal in the central region.

7. The method for producing a terminal component according to claim 6, wherein, in the first metal, a joining planned portion that is joined to the second metal is set, and an average thickness of nickel plating of the joining planned portion is less than an average thickness of nickel plating of the boundary surface.

8. The method for producing a terminal component according to claim 7, wherein the joining planned portion is set to include a center position of the boundary surface.

9. The method for producing a terminal component according to claim 6, wherein the step of preparing the first metal incudes plating nickel on the first metal by electroplating.

10. The method for producing a terminal component according to claim 6, wherein the step of preparing the first metal includes partially reducing a thickness of the nickel plating by polishing or laser irradiation.

* * * * *